INVENTOR.
Robert Adler
BY
Francis W. Crotty
Atty.

INVENTOR.
Robert Adler
BY Francis W. Crotty
Atty.

United States Patent Office 3,315,174

Patented Apr. 18, 1967

3,315,174

MULTIPLE RESONANT CYCLOTRON WAVE COUPLER FOR NONDEGENERATE PARAMETRIC AMPLIFIER

Robert Adler, Northfield, Ill., assignor to Zenith Radio Corporation, Chicago, Ill., a corporation of Delaware Original application June 9, 1960, Ser. No. 34,961. Divided and this application June 13, 1966, Ser. No. 563,622

5 Claims. (Cl. 330—4.7)

The present application is a division of copending parent application Ser. No. 34,961, filed June 9, 1960, now abandoned, by Robert Adler and assigned to the assignee of the present application.

The aforesaid parent application is a continuation-in-part of Adler application Ser. No. 738,546 filed May 28, 1958, now U.S. Patent No. 3,233,182 issued Feb. 1, 1966, and assigned to the same assignee as the present application.

The present invention is disclosed in connection with a technique that concerns the resistive loading which an electron beam produces in an adjacent circuit structure and is directed especially to a transverse-mode type of electron discharge device in which the resistive loading at a given signal frequency has an effective noise temperature that is low relative to the operating temperature of the device. In broad concept, the technique is addressed to the problem of cooling an electron beam where "cooling" refers to a decrease in the noise power associated with a beam immersed in a magnetic field as is characteristic of transverse-mode type electron beam devices. The beam cooling technique and its implementation in various embodiments as hereinafter described is disclosed and claimed in application Ser. No. 557,218, filed June 13, 1966, by Robert Adler and assigned the same, and which is a continuation-in-part of said parent application and also a consolidation with subject matter copending in application Ser. No. 326,737, filed Nov. 29, 1963, by the same inventor and assigned the same.

Cooling or decreasing of the noise power of the electron beam in such a device has an immediate and important application to certain signalling systems. For example, low noise transverse-mode amplifiers of both the parametric and travelling wave type have been developed with exceedingly attractive noise figures and certain of these devices can be improved still further in respect of noise through the application of the concept to be described herein by means of which cooling of the electron beam is possible. Additionally, a transverse-mode electron discharge device having a coupling structure coupled to the electron beam therein may be employed as a resistive termination or sink into which power may be dissipated and, if it is used as a load in a low noise system, distinct advantages accrue from cooling of the beam because then the noise contribution of the load to the system may be minimized. That is to say, the effective noise temperature of the terminating device may be reduced well below ambient temperature.

An object of the invention is to provide a novel structure for coupling to the electron beam of a transverse-mode electron discharge device.

The invention pertains to a device in which an electron beam is projected along a predetermined path immersed in a magnetic field which establishes a condition of cyclotron resonance for the electrons in the beam, and it particularly is directed to a signal coupler which comprises two similar series of conductive elements facing one another on opposite sides of the path. The elements have a spatial periodicity along the path in accordance with the expression $$\beta_f = \pi / L$$

where $\beta_f$ is the phase constant of the fast wave on the beam and L is the distance between corresponding points on contiguous elements of each of the series. Reactance means coupled to the two series of elements constitutes therewith a structure resonant at the desired interaction signal frequency.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 represents one form of resistive termination or load, constructed in accordance with the invention, having a cooled electron beam and characterized by a uniform magnetic field throughout the beam path of the structure;

FIGURE 1*a* is a dimensional diagram of a novel form of coupling structure included in the arrangement of FIGURE 1;

Figure 7:
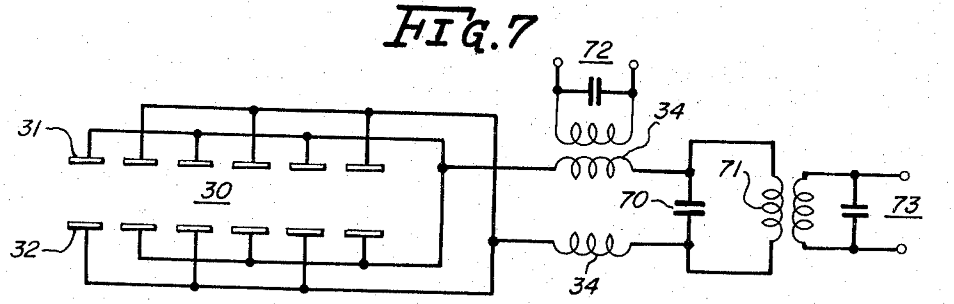

FIGURE 7 pertains to a novel form of coupling structure; and

Figures 1, 2, 8:
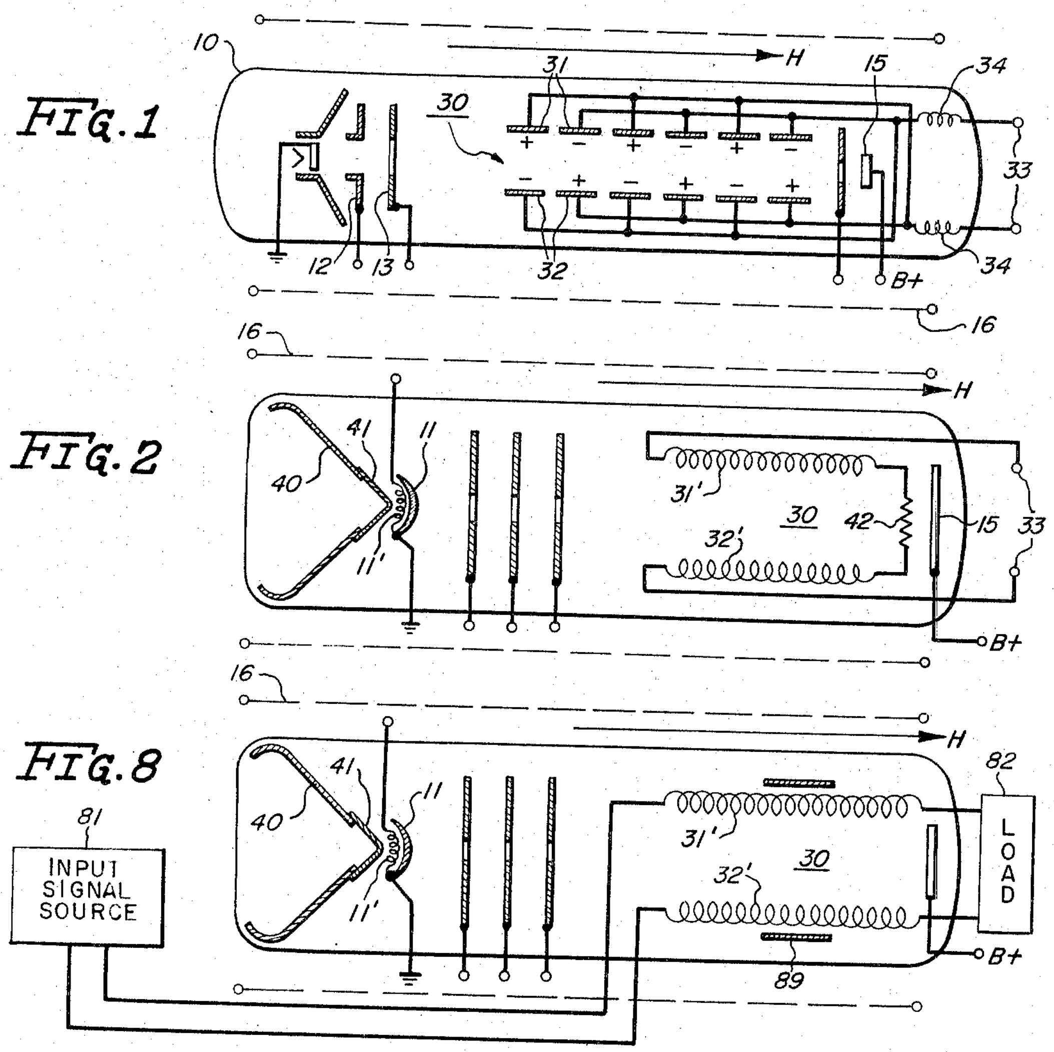
FIGURE 2 is a modified form of resistive terminating device having a non-uniform magnetic field and exhibiting electron resonance which, in all portions of the beam, is higher than the desired signal frequency.

FIGURE 8 represents a transverse-mode travelling wave tube having beam cooling.

Before describing the structural details of a transverse-mode electron discharge device in accordance with the present invention, it is appropriate to consider the noise power carried by a cyclotron wave in relation to the signal and cyclotron frequencies as well as the cathode temperature. In general, the power carried by the fast or slow cyclotron wave in such a device is in accordance with the following expression:

$$P = \frac{I_o}{2\eta} \frac{f}{f_c} v_t^2 \tag{1}$$

where $I_o$=D.C. beam current $\eta$=magnitude of ratio of charge to mass for an electron $v_t$=component of the transverse velocity of the electrons corresponding to the cyclotron wave under examination.

For cyclotron waves of random noise, caused by the thermal transverse velocities of electrons leaving the cathode, it can be shown that $v_t$ is independent of frequency. Therefore, the noise power carried by a fast or slow cyclotron wave corresponding to a given signal frequency is proportional to the ratio of that signal frequency $f$ to the cyclotron frequency $f_c$.

It is apparent from Equation 1 that cooling of the beam or reduction of its noise power, in respect of the fast or slow cyclotron waves, may be accomplished by employing a high ratio between the cyclotron and signal frequencies and, of course, the cyclotron frequency is adjustable by adjusting the intensity of the cyclotron or magnetic field in which the beam is immersed. In other words, the desired high ratio of cyclotron to signal frequencies may be easily obtained by the use of a high intensity magnetic field.

It is not essential that the high ratio of cyclotron to signal frequencies be maintained throughout the entire path of the beam. Coupling considerations, for example, may make it desirable to reduce this ratio, even to unity, and so long as the change is gradual enough that the principle of adiabatic invariance remains valid, the noise power is the same anywhere along the beam even though the cyclotron field may vary. In principle, cooling may be extended indefinitely by increasing the intensity of the cyclotron field in the immediate vicinity of the cathode and the beam can serve as a refrigerated load approaching zero degrees absolute temperature. Consideration will now be given to structures and arrangements employing this technique of beam cooling.

Referring more particularly to FIGURE 1, the device there represented is a transverse-mode type of electron discharge device including an electron gun structure positioned at one end of an enclosing envelope 10. The gun may be of any conventional design and, for convenience, is represented as the well-known modified form of Pierce gun having a cathode 11 and an apertured anode 12 which is maintained at a positive potential with respect to the cathode. The anode may be followed by an electrode system, indicated simply by an electrode 13, for focusing or shaping into a beam those electrons which pass through the aperture of the anode. This beam is directed along a path from cathode 11 to a collector electrode 15 disposed transversely of the path. The beam path usually corresponds to the axis of envelope 10.

The electron beam in the transverse-mode type of device is projected through a homogeneous magnetic focusing field, represented symbolically by the arrow H, which parallels and surrounds the beam path. As a practical matter, the means for developing the focusing field comprises a solenoid 16 arranged coaxially of envelope 10 and coupled to a direct current source (not shown) of adjustable magnitude to facilitate controlling the field intensity. In the embodiment of FIGURE 1, the field is uniform along the path from cathode 11 to collector 15 and is adjusted to have such intensity that the electron resonance frequency of the beam is high relative to, preferably several times higher than, the intended operating or signal frequency.

Circuit means are disposed transversely of the beam path between the electron gun and collector 15 in order to couple to the beam and also to couple the device as a resistance termination into a signalling system. This coupling means is designated 30 and is an iterative or interdigital type of coupler. It comprises a first series of fingers or conductive strips 31 positioned to one side of the beam path and extending transversely thereof and a like second series of strips 32 positioned symmetrically on the opposite side of the beam path. Alternate strips of the series 31 are connected together and alternate members of the series 32 are likewise connected together. Moreover, the two series are interconnected so that a voltage source applied to the structure results in facing members as well as contiguous members of the two series 31 and 32 being at opposite instantaneous polarities as illustrated. The two series 31 and 32 are connected to a pair of terminals 33, 33 through tuning inductors 34, 34. These inductors are designed to tune the coupler to exhibit sharp resonance at a desired signal or operating frequency.

As indicated above, transverse-mode type of electron discharge device, in response to deflection modulation of the beam, develop both a fast wave and a slow wave on the electron beam and their respective phase velocities may be expressed as follows:

$$V_f = \frac{u_o}{1 - \frac{\omega_c}{\omega}} \qquad (2)$$

$$V_s = \frac{u_o}{1 + \frac{\omega_c}{\omega}} \qquad (3)$$

where $u_o$=the electron velocity in the axial direction $\omega_c$=the radian cyclotron frequency $\omega$=the radian frequency of the signal modulation.

Where the cyclotron and signal frequencies are equal or close to one another in value, the fast and slow wave signals are sufficiently differentiated from one another in velocity that a coupled may be easily constructed to respond selectively to one or the other. Specifically, for the case where the signal and cyclotron frequencies are the same, the phase velocity of the fast wave is infinite and a lumped coupler, in the form of two deflector plates disposed symmetrically on opposite sides of the beam path, provides effective coupling essentially only to the fast wave signal. However, if the cyclotron frequency is several times the signal frequency, as is the case with the structure of FIGURE 1, the absolute magnitudes of the phase velocities of the fast and slow waves approach one another and it is much more difficult to separate them in a coupling structure on the basis of phase velocity. Nevertheless, this desirable result is attainable with the interdigital coupler of FIGURE 1 which may be dimensioned to achieve efficient coupling to the fast wave and substantially zero effective coupling to the slow wave. Additionally, dimensioning of the coupler permits determination of the beam loading resistance in accordance with the following expression:

$$R_{B(\omega)} = \left[8\frac{V_o}{I_o}\left(\frac{2a}{l}\right)^2\right]\left(\frac{\pi}{2}\right)^2\left[\frac{\pi\delta/L}{\sin\frac{\pi\delta}{L}}\right]^2\left[\frac{\sinh\frac{\pi a}{L}}{\frac{\pi a}{L}}\right]^2\left(\frac{\omega_c}{\omega}\right) \qquad (4)$$

where, $V_o$=longitudinal accelerating voltage determining beam velocity.

$a$=spacing of each series 31, 32 from the beam axis.

$l$=overall dimension of the coupler along the beam axis.

$\delta$=half the spacing between contiguous members of the series.

$L$=distance between corresponding points of any two contiguous members of either series.

$R_{B(\omega)}$=loading at the signal frequency.

Figure 1A:
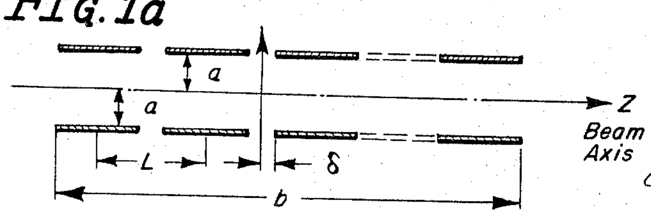

FIGURE 1A shows the application of these dimensions to the coupling structure.

The resistive and reactive components of impedance observed at terminals 33, 33 may be adjusted by varying beam current and beam velocity respectively and usually it is arranged that the device represents a predominantly resistive impedance of a predetermined nominal value. The terminating device may be coupled directly as a load in the signalling system or, if its terminal impedance is not suited for direct connection, an impedance matching network of any well-known construction may be interposed between terminals 33, 33 and the system component to which the device is to be coupled.

To have coupler 30 selective to the fast, as distinguished from the slow wave, it is dimensioned to achieve an integral number of full cycles phase difference of the slow relative to the fast wave over the entire length $l$ of the coupler. It will be apparent from Equations 2 and 3 that the absolute magnitude of the fast wave velocity is larger than that of the slow wave velocity. For optimum coupling in respect of the fast wave the following expression is to be satisfied:

$$\frac{\omega}{V_f} = \frac{\omega - \omega_c}{u_o} = \beta_f = -\pi/L \qquad (5)$$

At the same time for slow wave cancellation or minimum coupling in respect of the slow wave the following condition is to be satisfied:

$$|\beta_s|-|\beta_f|=2\pi N/l \quad (6)$$

where N is an integer and $\beta_s$ and $\beta_f$ are the phase constants of the slow and fast waves respectively.

One embodiment of the device of FIGURE 1 constructed and successfully operated as a cooled terminating resistor had the following specification:

| | |
|---|---|
| $a=.010''$ | $V_0=17$ volts |
| $\delta=.016''$ | $I_0=52$ ua |
| $L=0.064''$ | $\omega_c/\omega=9$ |
| $l=1.024''$ | |

The coupler has sixteen facing pairs of fingers which corresponded to eight fast wave lengths or, at the same time, to ten slow wave lengths through which slow wave cancellation was achieved. The coupler was sharply tuned to 90 megacycles; the cyclotron frequency was approximately 800 megacycles and the operating temperature of the cathode, without the cooling effect, was in the usual range of 1000° to 1200° K. The theoretical noise temperature of the beam at 90 megacycles should be approximately 120° K., representing a reduction of one-ninth which is the ratio of signal to cyclotron frequency. Losses in the system represented one-sixth of the total loading, and taking them into consideration leads to a theoretical effective beam temperature of 160° K. The observed value of effective beam temperature was 186° K., which reflects not only a material reduction in effective noise temperature of the beam but also close conformity with the theory of beam cooling developed above.

Figure 3:
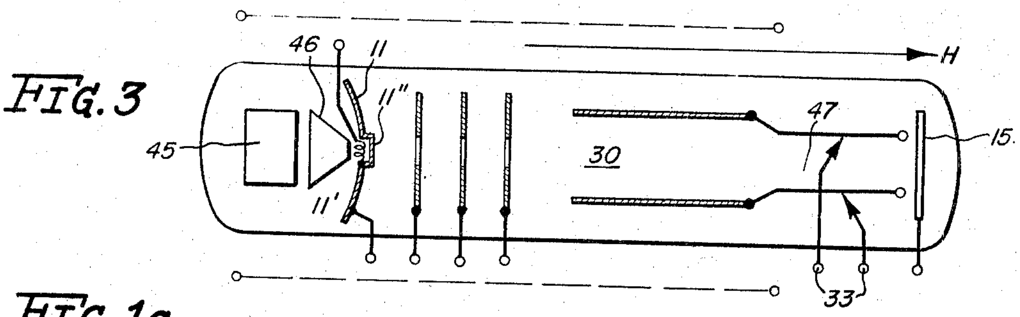
FIGURE 3 represents a further modification also having a non-uniform cyclotron field but characterized by the fact that the field intensity in the vicinity of the coupling structure establishes an electron resonance that is approximately equal to the desired signal frequency.

Other forms of cooled transverse-mode electron-discharge devices suitable for use as a resistive termination but featuring a non-uniform cyclotron field are represented in FIGURES 2 and 3. In FIGURE 2 the cathode 11 is convex in cross section and its heater is represented at 11'. The unnumbered apertured electrodes in front of the cathode accomplish the usual beam forming function. The solenoid 16 again develops a cyclotron field but, in this modification, the field is non-uniform; it has maximum intensity in the immediate vicinity of the cathode and decreases in intensity gradually in the direction of collector 15 to a minimum and, preferably a uniform, value which establishes, throughout the region of the tube in which the coupler is located, an electron resonance frequency higher than the signal frequency although substantially lower than the resonance frequency prevailing in the immediate vicinity of the cathode. This desired field distribution is attained by the use of a magnetic field concentrator positioned to the side of cathode 11 opposite that of collector 15. The intensifier 40 is a cone of magnetic material provided with a pole piece or terminating portion 41 of a ferro-magnetic material having a high Curie point, such as cobalt. With this construction, the field is greatly intensified in the region encompassing the cathode and immerses the emitting surface of the cathode in an intense cyclotron field.

Since the cyclotron field has uniform intensity in the region occupied by coupler 30 but is non-uniform in the region of the cathode, the arrow H has been displaced to the right in FIGURE 2. Also, this figure shows a different form of coupling structure 30 comprising a balanced helical transmission line, including two helices 31' and 32'. The transmission lines are positioned on opposite sides and in parallel relation to the beam path and are designed to have a propagation velocity substantially equal to the phase velocity of the fast wave. The end of the line closer to collector 15 is terminated in its characteristic impedance 42 and the opposite end of the coupler connects to terminals 33. The coupling of such a structure to the electron beam of the transverse-mode electron device and the matter of energy interchange therebetween is described in detail in copending application Ser. No. 804,249 filed Apr. 6, 1959, in the name of Robert Adler and assigned to the assignee of the present invention.

In the modification of FIGURE 3, solenoid 16 tends to establish a uniform cyclotron field throughout the path of travel of the electron beam and its magnitude is adjusted to achieve electron resonance at a frequency equal to the signal frequency. Cooling, through the expedient of a cyclotron field in the immediate vicinity of the cathode sufficiently strong to result in electron resonance several times the signal frequency, is introduced by an additional magnet structure adding an additional field component in the vicinity of the cathode. Specifically, a permanent magnet 45 is positioned behind the cathode structure on the side opposite collector electrode 15. Concentration of the field from the permanent magnet is accomplished by the concentrator 46 which intensifies the field of the magnet in the vicinity of the cathode structure. Here the cathode is generally dish-shaped with a projecting portion 11'' coated with an electron emitting substance and heated by the filament 11'. The intensity of the cyclotron field decreases along the length of the tube to a uniform value in the region occupied by coupler 30 such that the electron resonance frequency thereat is approximately equal to the signal frequency. The coupler may now be of a lumped structure, rather than the distributed parameter type shown in the modification of FIGURE 2. In the modification of FIGURE 3 the coupler comprises a pair of deflectors positioned on opposite sides of the beam path and connected to output terminals 33, 33 through an impedance-transforming transmission line section 47.

Figure 4:
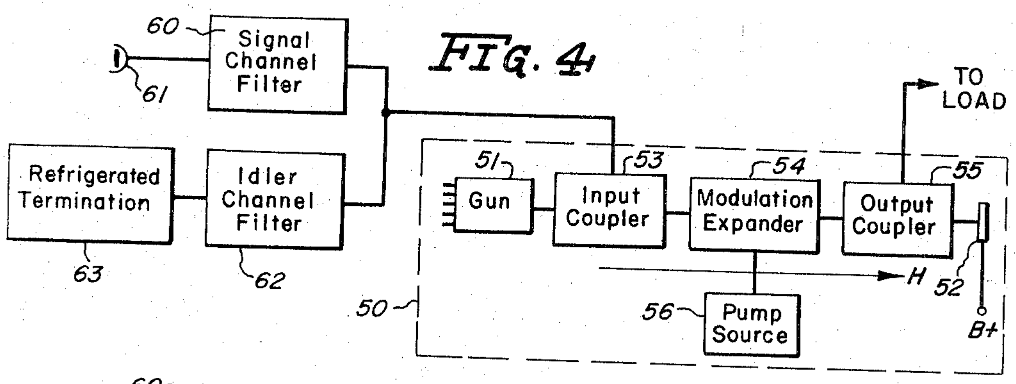
FIGURES 4 and 5 represent applications of the refrigerated terminating device to low noise signalling systems.
Figure 5:
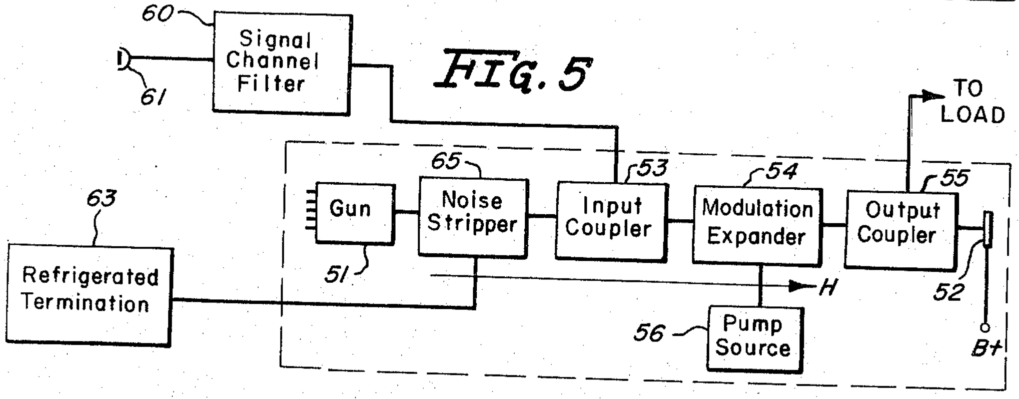

FIGURES 4 and 5 disclose signalling systems to which terminating devices of the type represented in FIGURES 1 to 3, inclusive, have particular application. FIGURE 4 shows in block diagram a parametric amplifier with an improved noise figure resulting from the application to the system of a refrigerated termination which may be constructed in accordance with the invention. The amplifier itself, which will be considered initially as of the degenerate form, is enclosed within the broken-line rectangle 50 and is depicted as comprising an electron gun structure 51 for developing and projecting an electron beam along a predetermined beam path to a collector 52 which terminates that path. The cyclotron field, represented symmetrically by the arrow H, is provided in the usual way so that the beam, being immersed in a homogeneous magnetic field, experiences electron resonance at a frequency equal to the frequency of the signal to be amplified. This frequency relation is characteristic of the degenerative form of parametric amplifier. Interposed between gun 51 and collector 52 in the order recited are an input coupled 53, a modulation expander 54 and an output coupler 55. The input and output couplers have the same construction and may be of the form represneted by structure 30 in FIGURE 3, comprising a pair of deflectors positioned on opposite sides of the beam path and an impedance-transforming transmission line section through which a signal source may be connected to the input coupler and through which a load circuit may be connected to the output coupler, respectively.

The modulation expander may be the now familiar quadrupole-type structure which develops a time variable non-homogeneous pumping field to accomplish modulation expansion and amplification of the fast electron wave carried by the beam after it has been modulated by an input signal with the help of input coupler 53. This pumping field derives its energy from a pump signal source 56 coupled to the quadrupole.

The structure as thus far described is disclosed and claimed in copending application Ser. No. 747,764 filed July 10, 1958, in the name of Glen Wade and now abandoned in favor of continuation application Ser. No. 289,-792, filed June 20, 1963, both assigned to the same assignee as the present invention.

One characteristic of the quadrupole modulation exander, and in fact of all modulation expanders for this ype of tube, is the production of an idler signal which is elated to the pump and desired signal frequencies in accordance with the following:

$$\omega_p = \omega_s + \omega_i \quad (7)$$

where the subscripts *p*, *s* and *i* represent the pump, desired signal and idler signal frequencies, respectively. Because of this relation, noise or other signal components at the idler frequency carried by the beam into the field of the quadrupole introduce noise into the signal channel and deteriorate its noise figure from its attractive theoretical potential. This may be improved, as indicated in the system of FIGURE 4, by interposing a bandpass filter 60 in the lead which couples an antenna 61 to input coupler 53. The bandpass filter is designed to select and pass only the desired signal frequency to the input coupler and reject signal components at the idler frequency. It is also necessary, however, to provide a termination for the idler noise originating in the electron gun and removed from the beam through the energy exchange accomplished by input coupler 53. The coupler strips fast wave noise components from the beam while at the same time modulating the beam with a desired input signal received from antenna 61. The idler components of the noise thus removed from hte beam must be dissipated in a resistive termination and this is accomplished by a filter 62 which is selective to the idler frequency signal components and passes them to a refrigerated termination 63. The terminating device may have the construction shown in any of FIGURES 1 to 3.

The improvement realized in noise performance in the arrangement of FIGURE 4 is that resulting from reducing the apparent noise temperature of the resistive termination 63 coupled to input coupler 53 as an energy sink for fast wave idler noise components. If a conventional resistive termination, having no refrigeration, is employed it is equivalent to a noise source at ambient temperature but refrigerating the termination causes it to appear to have a much lower temperature and to contribute correspondingly less noise to the system. If for example the termination is at room temperature which is approximately 290° K., the degradation in noise on the system because of the effect of the noisy termination is in the neighborhood of 3 decibels. Providing a termination of the type described hereinabove, featuring cooling of the electron beam to establish an apparent noise temperature in the neighborhood of 180° K. or even less, effects a corresponding reduction in noise and improvement in signal-to-noise ratio.

The same sort of improvement may be realized by precooling the beam of the parametric amplifier as accomplished in the arrangement represented in FIGURE 5. In this modification an added coupler or noise stripper 65 is interposed between electron gun 51 and input coupler 53 of the amplifier. It may be the same sort of structure as the input coupler but merely serves the purpose of removing noise from the electron beam as the beam travels toward the input coupler. Noise stripper 65 is terminated by the refrigerated termination 63. The system works essentially the same as the system of FIGURE 4 differing only in that noise components at the idler frequency carried by the beam are dealt with ahead of the input coupler.

The arrangement of FIGURE 5 may also represent the case wherein the amplifier is of the non-degenerate type and in which the idler frequency is higher than the signal frequency and also exceeds the cyclotron frequency. For the assumed conditions and in the absence of noise stripper 65, the effective noise temperature of the beam at the idler frequency is greater than the operating or cathode temperature as will be understood by inserting in Equation 1 the selected values of idler and cyclotron frequency. If noise stripper 65 is now employed and a resistor at room temperature is used in place of resistance termination 63, matters are improved because the effective noise temperature of the beam at the idler frequency is now reduced to ambient temperature.

It may be shown that hte conversion of the fast wave idler frequency components in the quadrupole to the signal frequency introduces a power change in the ratio of signal frequency to idler frequency. Since it has been assumed that the idler frequency is greater than the signal frequency, this introduces a further reduction in noise power.

A still further improvement results from terminating noise stripper 65 in the refrigerated type of termination represented, for example, by the structures of FIGURES 1 to 3. The presence of the refrigerated termination may modify the apparent temperature of the electron beam in respect of fast wave noise components at the idler frequency from ambient or 290° K. to a much lower value, for instance, 80° K. Since the same proportional reduction in noise power results in the conversion process within the quadrupole, the final effective or apparent noise temperature of the system at the idler frequency may be brought close to absolute zero. In concluding this discussion of FIGURE 5, for the case wherein the signal and idler frequencies are quite different from one another, it is to be pointed out that such a system may use coupling structures of the distributed parameter type as described in Adler application Ser. No. 804,249, filed Apr. 6, 1959. This is particularly so if the relative values of signal, cyclotron and pump frequencies result in forward and backward moving fast waves on the electron beam.

Figure 6:
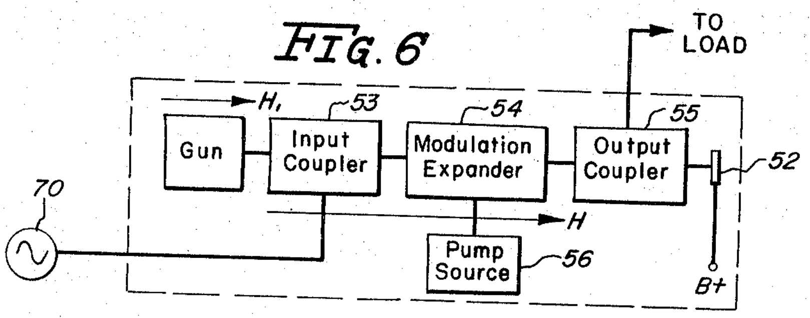
FIGURE 6 is a block representation of a transverse-mode parametric amplifier employing cooling of the electron beam.

FIGURE 6 is another representation of a parametric amplifier in which a signal source 70 is represented as connected to input coupler 53. After amplification, the signal is delivered to a load through output coupler 55. To obtain best results with this amplifier it is necessary to achieve impedance match of the input coupler to the input signal source. A mismatch at the input gives rise to signal reflections and deterioration of the noise figure but the adverse effects of such a mismatch may be reduced by cooling the beam of the amplifier. Accordingly, arrow H1 indicates that the cyclotron frequency in the immediate vicinity of the electron gun, particularly at its cathode, is greatly intensified to reduce the apparent noise temperature of the beam at the operating signal frequency. This may be accomplished by the use of field concentrators or additional magnet arrangements located just beyond the cathode all as discussed in conjunction with FIGURES 2 and 3, respectively.

The input coupler in the arrangements of FIGURES 4 and 6 serves the dual function of modulating a received input signal on the beam and concurrently deriving from the beam fast wave noise components at the idler frequency carried by the beam into the field of the coupler. Where the significant frequencies of the amplifier establish the forward/backward fast wave conditions described in Adler application Ser. No. 804,249, the interdigital or iterative type of coupling structure illustrated in FIGURE 1 has uniquely attractive characteristics. In this condition the signal frequency is less than the cyclotron frequency while the idler frequency is greater than the cyclotron frequency and one may assume the special case in which the signal and idler frequencies are symmetrical with respect to the cyclotron frequency. Since the pump frequency is equal to the sum of the signal and idler frequencies, the special case may be realized by using a pumping frequency which is twice the cyclotron frequency. The phase constant at the pump frequency is always equal to the sum of the phase constants at the signal and idler frequencies. Therefore, if the pump structure or modulation expander is a lumped quadrupole, the pumping phase constant is zero and the phase constants at the signal and idler frequencies become equal in absolute value. This means that an iterative coupler with appropriate spatial periodicity will provide effective coupling to both the signal and idler waves; the periodicity of the fingers is given by Equation 5, above. Specifically, the dimension 2L is equal to the wave length of the signal wave and the wave length of the idler, or:

$$\lambda_s=\lambda_i=2L$$

Such waves may then be separated by including the coupler in a multi-resonant structure having one resonance at the signal frequency and another at the idler frequency. A suitable such arrangement is indicated schematically in FIGURE 7.

The coupler is again shown as including a first series of spaced strips or fingers 31 and a second similar series of spaced members 32 positioned on opposite sides of the beam path in symmetrical and facing relation. A pair of inductors 34, 34 are connected across the coupler by means of a capacitor 70 which, in turn, is connected in parallel with another tuning inductor 71. This network, including tuning inductors 34 and 71 as well as capictor 70 and the capacitance represented by coupler 30, has two modes of resonance: (1) a high-frequency mode including coupler 30 in seires with inductors 34, 34 and capacitor 70; and (2) a low-frequency mode in which the coupler and capacitor 70 are in parallel with tuning inductor 71. The high-frequency mode is resonant at the idler frequency and the low-frequency mode is resonant at the signal frequency. Accordingly, a first frequency selective network 72, including a coil inductively coupled to inductor 34, selects the idler signal for application to a load and a second frequency selective network 73, coupled to inductor 71, selects the signal frequency for connection to a signal source.

A coupler and multiple resonant structure of the type represented in FIGURE 7 may be employed in the system of FIGURES 4 or 6, replacing input coupler 53. When so utilized, selector 73 becomes the signal channel filter 60 and selector 72 is connected to refrigerated termination 63. Functionally, the coupler effects deflection modulation of the electron beam in response to the input signal applied through selector 73 and concurrently strips fast noise components at the idler frequency from the beam and dissipates that energy in refrigerated termination 63. This, then, has the further advantage of the reduced effective noise temperature realized through the presence of the refrigerated termination 63. The output coupler may likewise be of the iterative type but it is only necessary to tune to the desired signal component which, for the assumed case, is the signal frequency selected by input selector 73. It has been stated that the backward/forward arrangement under consideration presupposes the use of a lumped quadrupole as modulation expander 54. Such a quadrupole is described and claimed in the aforementioned copending application of Glen Wade, Ser. No. 747,764, filed July 10, 1958, and assigned to the same assignee as the present invention.

It has been indicated that beam cooling is effective in reducing noise power for both the fast and slow cyclotron waves in a transverse-mode type of device. This may be put to advantage in the construction of travelling wave or backward wave amplifiers which are slow wave mechanisms and the application of the technique to a transverse mode travelling wave tube is represented in FIGURE 8. Structurally, the tube is similar to that of FIGURE 2 and corresponding components are identified by similar reference characters. For the travelling wave tube, however, the slow wave circuit comprising helices 31′ and 32′ is coupled to and interacts with the beam throughout most of the beam path and, in order to obtain amplification, it is necessary that the phase velocity of the signal wave on the helices be synchronous with the phase velocity of the slow cyclotron wave on the electron beam. The phase velocity of the slow wave structure may be adjusted by appropriately selecting the parameters of helices 31′, 32′ and the phase velocity of the slow cyclotron wave on the beam may be adjusted by controlling the intensity of the magnetic field provided by solenoid 16. The end of the structure closer to the cathode couples to the input signal source 81, with an intervening impedance matching network (not shown) if that be necessary to achieve impedance matching at the input. The terminals of the slow wave structure adjacent collector 15 on the other hand couple to the utilizing or load circuit 82. Midway of helices 31′ and 32′ is the usual attenuator 89 used to suppress signal waves which may travel in a backward direction on the slow wave circuit.

A reduction in the noise power of the beam results from the fact that the cyclotron frequency in the immediate region of the cathode is very high relative to the signal frequency, as described in conjunction with FIGURE 2. The cooled beam in travelling the beam path to collector 15 is coupled to slow wave structure 31′, 32′ and is deflection-modulated by the input signal applied to that structure. Since the signal wave on the slow wave structure and the slow cyclotron wave on the beam are synchronous, there is continuous interaction therebetween as the beam travels the field of the slow wave structure which achieves travelling wave type amplification in the usual manner. The amplified signal is applied to the load circuit for utilization.

The foregoing description has particularized as to structures for accomplishing cooling of the electron beam in a transverse-mode electron discharge device. It has shown the utilization of this concept in refrigerated terminating devices as well as its application to systems of amplification employing transverse-mode techniques. Both benefit materially from the reduced apparent noise temperature which the cooling technique makes possible. Viewed from a method standpoint, the technique contemplates that the cyclotron field employed to establish transverse electron resonance in the device have such a high intensity in the immediate vicinity of the cathode that the electron resonance thereat is high relative to the signal frequency. In practicing this method, depending on the requirements of a particular installation, the high intensity cyclotron field may be established uniformly throughout the device or it may be non-uniform with the field decreasing gradually from a very high value in the immediate vicinity of the cathode to a much reduced value further along the beam path. So long as the change in field is sufficiently gradual as to satisfy the requirements of adiabatic invariance, the noise power is the same anywhere along the beam in spite of local changes along the cyclotron field.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a device in which an electron beam is projected along a predetermined path immersed in a magnetic field establishing a condition of cyclotron resonance for the electrons in said beam, a signal coupler comprising:

two similar series of conductive elements facing one another on opposite sides of said path with a spatial periodicity of said elements along the path in accordance with the expression $$\beta_f=\pi/L$$

where $\beta_f$ is the phase constant of the fast wave on said beam and L is the distance between corresponding points on contiguous elements of each of said series;

and reactance means coupled to said two series of elements to constitute therewith a structure resonant at the desired interaction signal frequency.

2. A device as defined in claim 1 in which the frequency of cyclotron resonance is high relative to said interaction signal frequency.

3. A device as defined in claim 1 in which the overall length of said coupler is such that there is an integral number of full cycles phase difference over the length of the coupler between said fast wave and the slow wave on said beam at said signal frequency.

4. A device as defined in claim 1 which includes means for subjecting said electrons to a time-variable in-homogeneous pumping field and with the pumping frequency being twice the frequency of said cyclotron resonance condition and with the beam exhibiting fast waves at both signal and idler frequencies symmetrically located relative to said cyclotron frequency, said spatial periodicity having the same relation to the wavelength at both said signal and idler frequencies, said structure having one mode of resonance at said signal frequency and another mode of resonance at said idler frequency, and the connection of said two series within said structure establishing facing ones of said elements as well as contiguous ones of said elements at opposed instantaneous polarity.

5. A device as defined in claim 1 which includes means for subjecting said electrons to a time-variable in-homogeneous pumping field with the pumping frequency being twice the frequency of said cyclotron resonance condition and with the beam exhibiting fast waves at both signal and idler frequencies symmetrically located relative to said cyclotron frequency, said spatial periodicity having the same relation to the wavelength at both said signal and idler frequencies, said structure having one mode of resonance at said signal frequency and another mode of resonance at said idler frequency, and frequency selective means coupled to said structure for transferring energy relative thereto at at least one of said signal and idler frequencies.

No references cited.

ROY LAKE, *Primary Examiner.*

D. HOSTETTER, *Examiner.*